(12) United States Patent
Chen et al.

(10) Patent No.: US 11,641,145 B2
(45) Date of Patent: May 2, 2023

(54) ELECTRONIC DEVICE AND MOTOR ASSEMBLY THEREOF

(71) Applicant: ASUSTeK COMPUTER INC., Taipei (TW)

(72) Inventors: Chui-Hung Chen, Taipei (TW); Ching-Yuan Yang, Taipei (TW); Chia-Min Cheng, Taipei (TW); Cheng-Han Chung, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 57 days.

(21) Appl. No.: 17/337,512

(22) Filed: Jun. 3, 2021

(65) Prior Publication Data

US 2021/0384799 A1  Dec. 9, 2021

(30) Foreign Application Priority Data

Jun. 9, 2020  (TW) ................. 109119349

(51) Int. Cl.
*H02K 7/11* (2006.01)
*H02K 7/116* (2006.01)
(Continued)

(52) U.S. Cl.
CPC ........... *H02K 7/1166* (2013.01); *F16H 25/20* (2013.01); *F16H 37/065* (2013.01);
(Continued)

(58) Field of Classification Search
CPC ............... H02K 7/1166; H04M 1/0264; F16H 2702/00; F16H 2025/209;
(Continued)

(56) References Cited

U.S. PATENT DOCUMENTS 6,773,117 B2 * 8/2004 Watanabe ............ G03B 21/147
353/101
7,965,934 B2 * 6/2011 Wang ..................... G03B 17/00
74/89.37
(Continued)

FOREIGN PATENT DOCUMENTS

| CN | 107682610 A | 2/2018 |
| CN | 207802036 U | 8/2018 |
| CN | 208782851 U | 4/2019 |
| CN | 111064872 A | 4/2020 |

*Primary Examiner* — David M Fenstermacher
(74) *Attorney, Agent, or Firm* — McClure, Qualey & Rodack, LLP

(57) ABSTRACT

An electronic device is provided. The electronic device includes a function module, a body, and a motor assembly. The body includes an accommodation space for accommodating the function module. The motor assembly includes a drive motor, a gear, a rotation output shaft, a displacement mechanism, and a latch. The drive motor includes a shaft. The gear is fixedly attached to the shaft. The rotation output shaft includes a gear teeth portion. The gear teeth portion is coupled to the gear. The rotation output shaft is connected to the function module and is configured to drive the function module to rotate. The displacement mechanism synchronizes with the shaft and is separated from the rotation output shaft. The displacement mechanism includes a linear motion component. The latch is connected to the linear motion component, and is configured to engage the function module.

8 Claims, 6 Drawing Sheets

(51) Int. Cl.
*F16H 25/20* (2006.01)
*F16H 37/06* (2006.01)
*H04M 1/02* (2006.01)

(52) U.S. Cl.
CPC .. *F16H 2025/204* (2013.01); *F16H 2025/209* (2013.01); *F16H 2025/2046* (2013.01); *F16H 2025/2081* (2013.01); *F16H 2702/00* (2013.01); *H04M 1/0225* (2013.01); *H04M 1/0264* (2013.01)

(58) Field of Classification Search
CPC ..... F16H 2025/2081; F16H 2025/2046; F16H 2025/204; F16H 37/065; F16H 25/20
See application file for complete search history.

(56) References Cited

U.S. PATENT DOCUMENTS

| | | | |
|---|---|---|---|
| 10,419,589 B2 * | 9/2019 | Fan | H04M 1/0264 |
| 10,785,353 B1 * | 9/2020 | Li | H04M 1/0264 |
| 10,812,698 B1 * | 10/2020 | Zhou | H04N 5/2257 |
| 2002/0047408 A1 * | 4/2002 | Tanaka | H02K 11/22 310/99 |
| 2007/0009247 A1 * | 1/2007 | Maeda | H04M 1/0237 348/E5.025 |
| 2019/0195422 A1 * | 6/2019 | Nhan | F16H 1/12 |
| 2020/0271204 A1 * | 8/2020 | Momose | F16H 25/2025 |
| 2020/0358887 A1 * | 11/2020 | Lee | H04M 1/0235 |
| 2021/0051272 A1 * | 2/2021 | Liu | H04N 5/2257 |
| 2022/0071035 A1 * | 3/2022 | Zhang | H05K 5/0226 |
| 2022/0174138 A1 * | 6/2022 | Lee | H04M 1/0237 |

* cited by examiner

ELECTRONIC DEVICE AND MOTOR ASSEMBLY THEREOF

CROSS-REFERENCE TO RELATED APPLICATION

This application claims the priority benefit of Taiwan Application Serial No. 109119349, filed on Jun. 9, 2020. The entirety of the above-mentioned patent application is hereby incorporated by reference herein and made a part of the specification.

BACKGROUND OF THE INVENTION

Field of the Invention

The disclosure relates an electronic device and a motor assembly thereof.

Description of the Related Art

In recent years, the industry has proposed various solutions to implement a full-screen smartphone, one of which is to use a flip camera. How to make the flip camera stably folded is one of goals that the related industry strives for.

BRIEF SUMMARY OF THE INVENTION

According to the first aspect of the disclosure, a motor assembly is provided. The motor assembly includes a drive motor comprising a shaft; a gear fixedly attached to the shaft; a rotation output shaft comprising a gear teeth portion separated from the rotation output shaft, the displacement mechanism portion coupled to the gear teeth portion; a displacement mechanism synchronizing with the shaft and comprising a linear motion component; and a latch connected to the linear motion component.

According to the second aspect of the disclosure, an electronic device is provided. The electronic device includes a function module, a body, and a motor assembly. The body includes an accommodation space for accommodating the function module. The motor assembly includes a drive motor comprising a shaft; a gear fixedly attached to the shaft; a rotation output shaft comprising a gear teeth portion coupled to the gear; a displacement mechanism synchronizing with the shaft and separated from the rotation output shaft, the displacement mechanism comprising a linear motion component; and a latch connected to the linear motion component. The rotation output shaft of the motor assembly is connected to the function module, and is configured to drive the function module to rotate. The latch is configured to engage the function module.

When the motor assembly of the disclosure drives the function module to rotate, the motor assembly also drives the latch to move through the displacement mechanism. The latch engages the function module to lock the function module in the accommodation space.

BRIEF DESCRIPTION OF THE DRAWINGS

To make the above and other objectives, features, advantages, and embodiments of the disclosure more comprehensible, descriptions of the accompanying drawings are provided as follows.

DETAILED DESCRIPTION OF THE EMBODIMENTS

Figure 1:
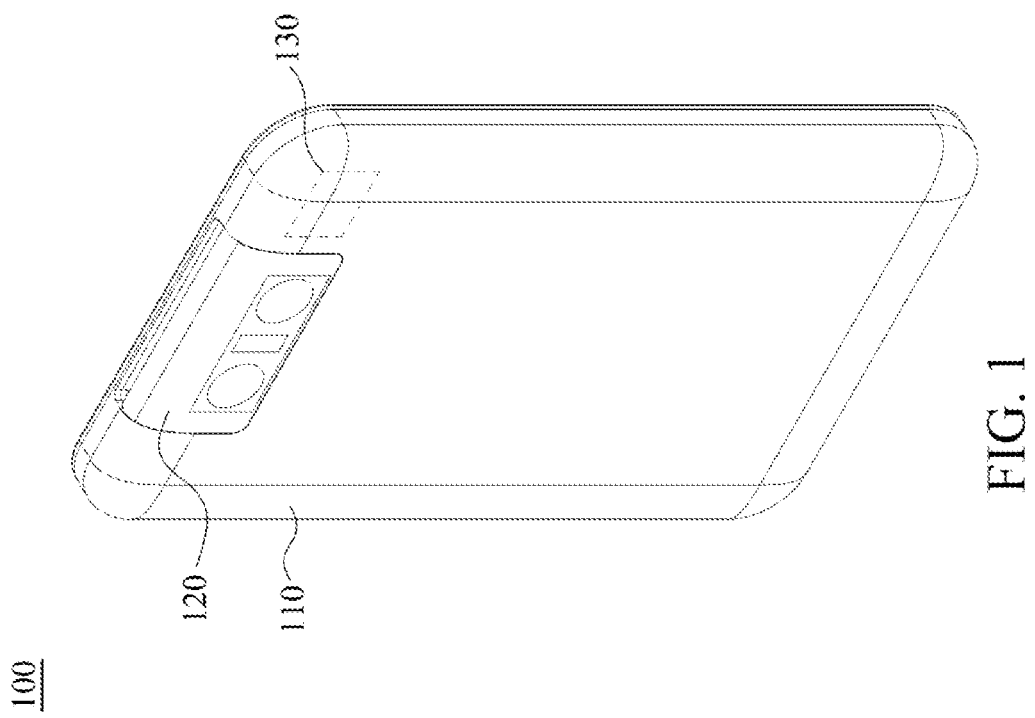
FIG. 1 and FIG. 2 are three-dimensional diagrams of an electronic device in two different operating states according to an embodiment of the disclosure.

To make the description of the disclosure more detailed and complete, reference is made to the accompanying drawings and various embodiments described below. Various components in the drawings are not drawn to scale and are provided merely to illustrate the disclosure. To provide full understanding of the disclosure, various practical details are described below. However, a person of ordinary skill in the related art understands that the disclosure is implemented without one or more of the practical details. Therefore, these details are not used to limit the disclosure.

Figure 2:
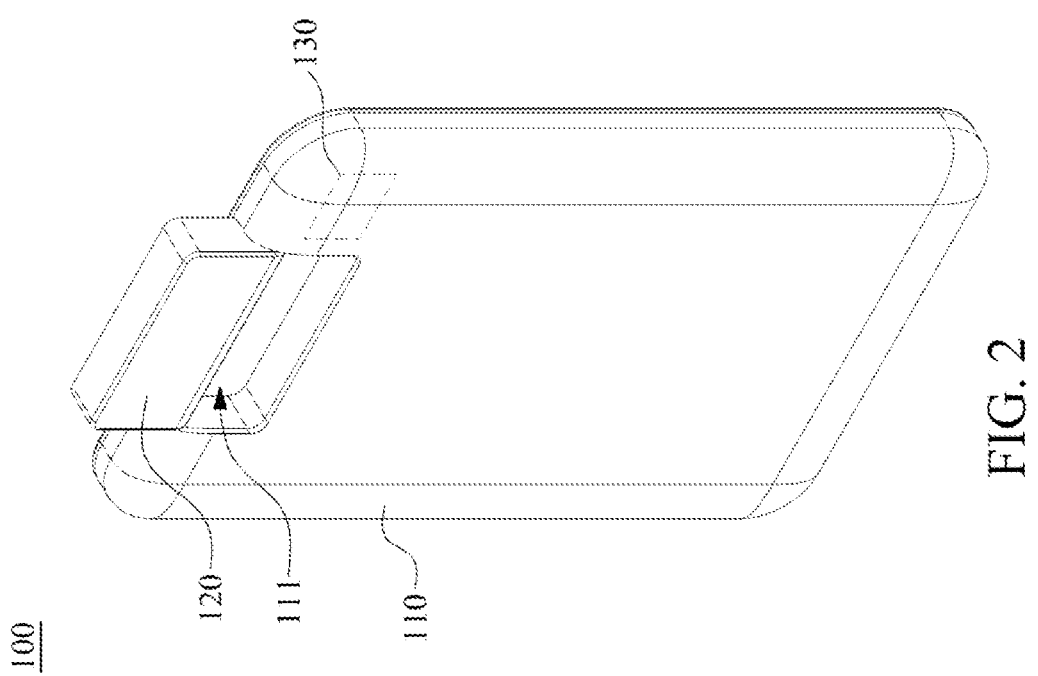

Referring to FIG. 1 and FIG. 2, an electronic device 100 (such as a smartphone) includes a body 110, a function module 120, and a motor assembly 130. The body 110 includes an accommodation space 111. The function module 120 is rotatably disposed on the body 110 and is accommodated in the accommodation space 111. The motor assembly 130 is also disposed on the body 110. Specifically, the motor assembly 130 is disposed on one side of the accommodation space 111. The motor assembly 130 is connected to the function module 120, and is configured to drive the function module 120 to rotate relatively to the body 110.

In an embodiment, the function module 120 rotates in a range between a first position (in the accommodation space 111) shown in FIG. 1 and a second position (extending to one side of the body 110) shown in FIG. 2. In an embodiment, the function module 120 includes an image capturing device with a photosensitive element, a lens, and a flashlight, to provide a photographing function or a video recording function. In an embodiment, the function module 120 serves as a rear lens at the first position and serves as a front lens at the second position.

In an embodiment, there is a substantial difference of 180 degrees between the first position and the second position. In other words, the function module 120 rotates 180 degrees from the first position to the second position. In an embodiment, the function module 120 also includes a speaker or a receiver, to provide a voice playback/reception function.

Figure 3:
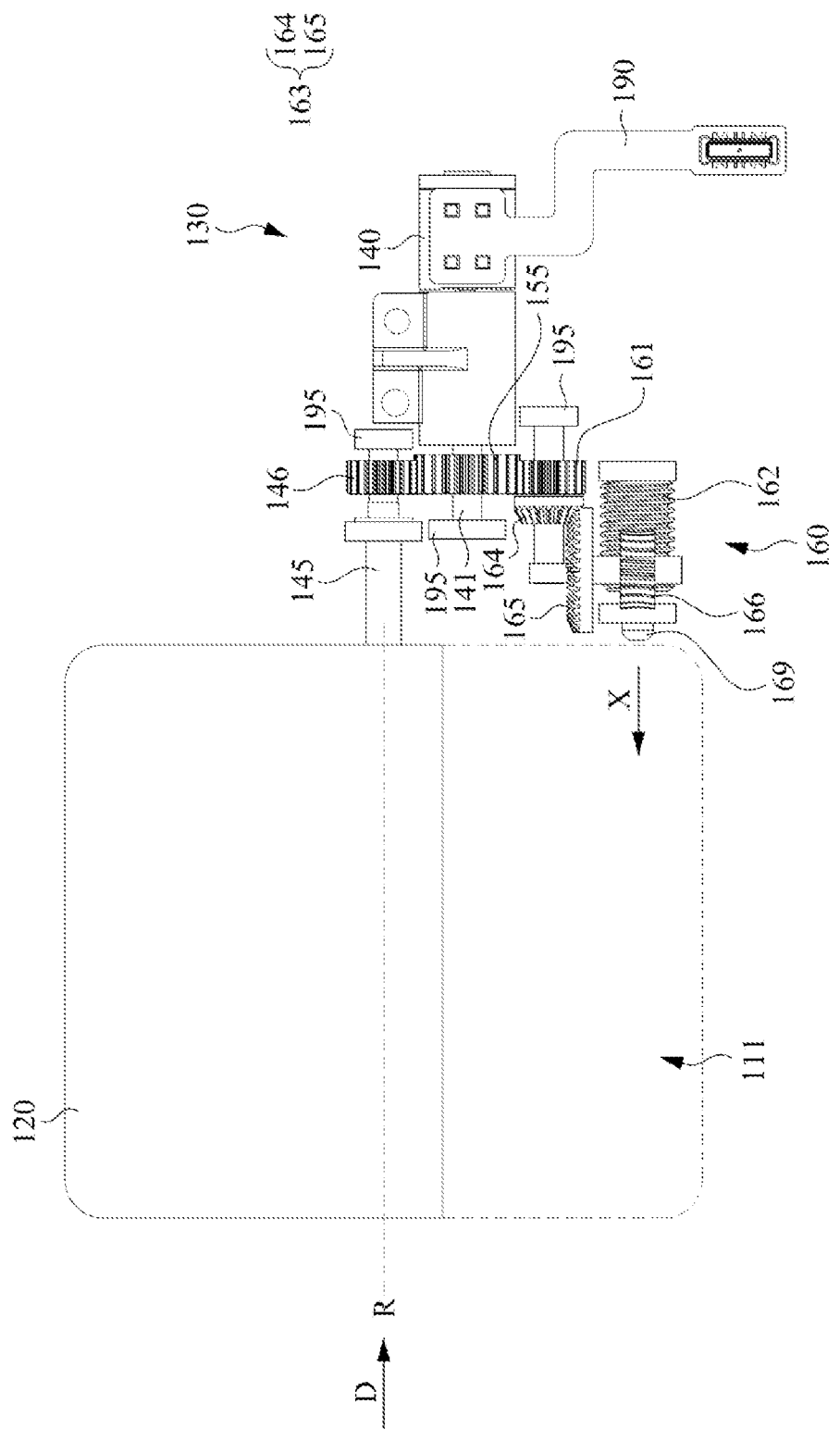
FIG. 3 is a schematic front view of a motor assembly and a function module of the electronic device in FIG. 1.
Figure 4:
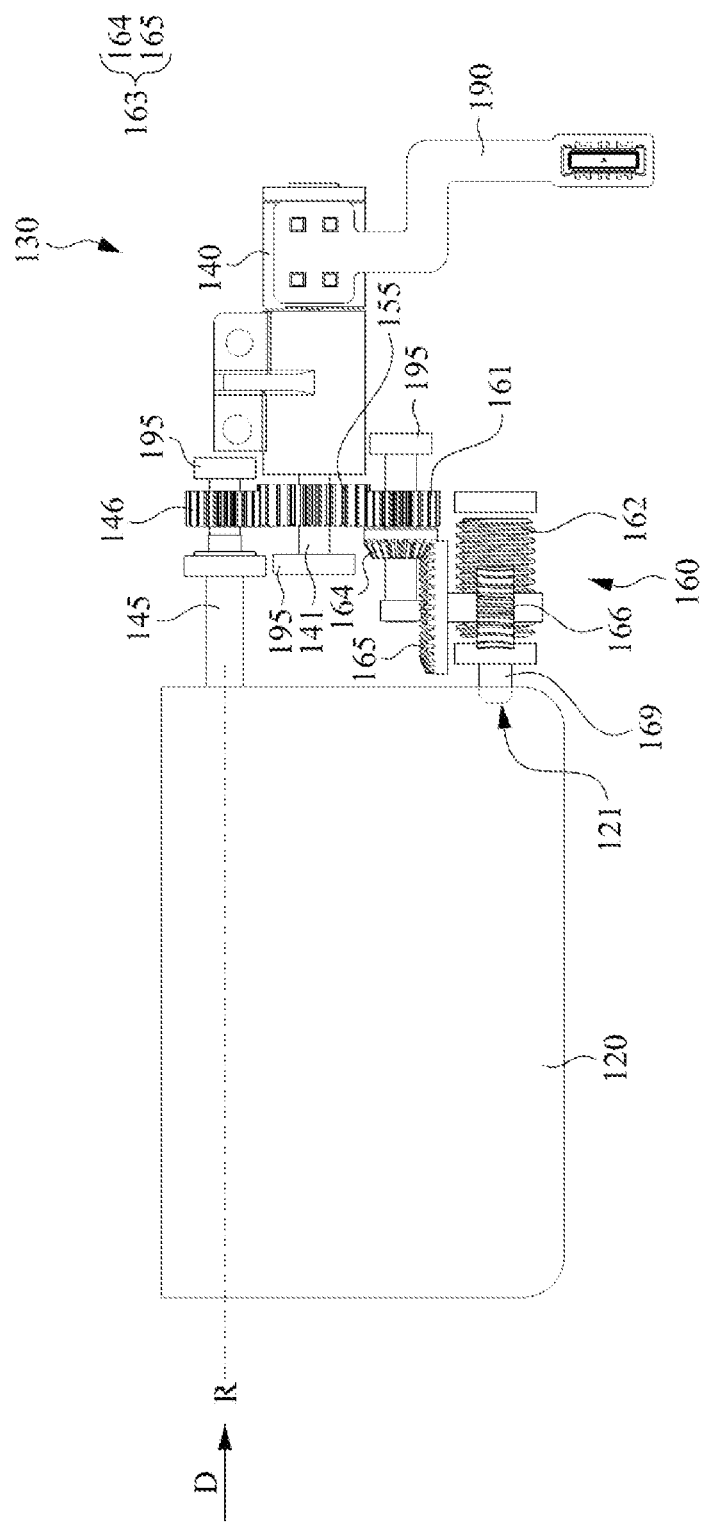
FIG. 4 is a schematic front view of a motor assembly and a function module of the electronic device in FIG. 2.

Referring to FIG. 3 and FIG. 4, the motor assembly 130 includes a drive motor 140, a rotation output shaft 145, and a latch 169. The drive motor 140 is a power source, and drives the rotation output shaft 145 to rotate and drives the latch 169 to reciprocate. The rotation output shaft 145 is connected to the function module 120 and drives the function module 120 to rotate. The latch 169 and the drive motor 140 are located on the same side of the accommodation space 111. In an embodiment, the latch 169 limit the function module 120 to lock the function module 120 in the first position and prevent the function module 120 from accidentally detaching from the accommodation space 111 due to an external force (in an embodiment, when the electronic device 100 is placed on a vehicle, vibration of the vehicle causes the function module 120 to detach from the accommodation space 111).

As shown in FIG. 3 and FIG. 4, the drive motor 140 includes a shaft 141. The motor assembly 130 further includes a gear 155. The gear 155 is fixedly attached to the shaft 141. The rotation output shaft 145 is located on one side of the gear 155 and includes a gear teeth portion 146. The gear teeth portion 146 is coupled to the gear 155 (in this embodiment, the gear teeth portion 146 directly meshes with the gear 155). In this way, the drive motor 140 drives the rotation output shaft 145 and the function module 120 connected to the rotation output shaft 145 to rotate around a rotation axis R through the gear 155.

As shown in FIG. 3 and FIG. 4, the motor assembly 130 further includes a displacement mechanism 160. The displacement mechanism 160 synchronizes with the shaft 141 of the drive motor 140, and is separated from the rotation output shaft 145. In other words, the drive motor 140 drives the rotation output shaft 145 and the displacement mechanism 160 individually. In an embodiment, the displacement mechanism 160 includes an input gear 161. The gear 155 is coupled to the input gear 161 to transmit power from the drive motor 140 to the displacement mechanism 160.

As shown in FIG. 3 and FIG. 4, the displacement mechanism 160 further includes a linear motion component 162. The linear motion component 162 is connected to the latch 169. The latch 169 moves toward a direction X along with the linear motion component 162, to limit the function module 120 and lock the function module 120 in the first position. In an embodiment, the latch 169 moves opposite to the direction X along with the linear motion component 162 to detach from the function module 120, so that the function module 120 leaves the first position (in an embodiment, when a user enables a front lens function).

As shown in FIG. 3, when the function module 120 is located outside the accommodation space 111, the latch 169 is also located outside the accommodation space 111 and avoids hindering the function module 120 from entering the accommodation space 111. As shown in FIG. 4, when the function module 120 is driven by the drive motor 140 to rotate into the accommodation space 111 along an axial direction D (that is, when an angular velocity direction of the function module 120 is the axial direction D, such as the function module 120 switching from a front lens mode to a rear lens mode) and cannot continue to rotate along the axial direction D due to the body 110, the drive motor 140 drives the latch 169 to move toward the direction X to approach the function module 120 through the displacement mechanism 160 and limit the function module 120, to lock the function module 120 in the accommodation space 111.

In an embodiment, when the function module 120 cannot continue to rotate along the axial direction D due to the body 110, a skid occurs between the gear 155 and the gear teeth portion 146 of the rotation output shaft 145. The drive motor 140 drives the gear 155 rotate continuously and the displacement mechanism 160 drives the latch 169 to limit the function module 120.

As shown in FIG. 4, in an embodiment, the function module 120 includes an accommodation hole 121. When the drive motor 140 drives, through the displacement mechanism 160, the latch 169 to move, the latch 169 extend into the accommodation hole 121, to limit rotation of the function module 120.

As shown in FIG. 4, when the rotation output shaft 145 is driven by the drive motor 140 to apply a torque opposite to the axial direction D to the function module 120 locked in the accommodation space 111 (in an embodiment, when the function module 120 is switched from the rear lens mode to the front lens mode), the function module 120 cannot rotate due to the engagement with the latch 169. In this case, as shown in FIG. 3, the drive motor 140 drives the latch 169 to move away from the function module 120 and detach from the function module 120 through the displacement mechanism 160. The function module 120 then freely leaves the accommodation space 111.

In an embodiment, when the function module 120 cannot rotate due to the latch 169, a skid occurs between the gear 155 and the gear teeth portion 146 of the rotation output shaft 145. The drive motor 140 drives the gear 155 to rotate continuously and the displacement mechanism 160 drives the latch 169 to detach from the function module 120.

As shown in FIG. 3 and FIG. 4, in an embodiment, the displacement mechanism 160 further includes a steering mechanism 163. In an embodiment, the steering mechanism 163 transmits power between the shaft 141 of the drive motor 140 and the linear motion component 162, so that the linear motion component 162 and the latch 169 connected to the linear motion component 162 move substantially parallel to the rotation axis R of the rotation output shaft 145. In other words, in this embodiment, the direction X is substantially parallel to the rotation axis R.

As shown in FIG. 3 and FIG. 4, in an embodiment, the steering mechanism 163 includes bevel gears 164 and 165. The bevel gear 164 synchronizes with the input gear 161. The bevel gear 165 meshes with the bevel gear 164 and is driven by the bevel gear 164 to rotate to be used as an output of the steering mechanism 163.

As shown in FIG. 3 and FIG. 4, in an embodiment, the linear motion component 162 is a worm. The displacement mechanism 160 further includes a worm gear 166. The worm gear 166 is coupled to the steering mechanism 163 and meshes and drives the worm to move toward or opposite to the direction X. In an embodiment, the steering mechanism 163 is a bevel gear set (that is, including the bevel gears 164 and 165), the worm gear 166 and the bevel gear 165 are fixedly attached to the same shaft and rotate synchronously with the bevel gear 165.

As shown in FIG. 3 and FIG. 4, in an embodiment, the motor assembly 130 further includes a circuit board 190 electrically connected to the drive motor 140. In an embodiment, the drive motor 140 receives a signal (such as a control signal from a processor of the electronic device 100 or another controller) through the circuit board 190 to drive the rotation output shaft 145 to rotate and drive the latch 169 to move. In an embodiment, the circuit board 190 includes a flexible printed circuit (FPC), a high density circuit board, or a printed circuit board (PCB).

As shown in FIG. 3 and FIG. 4, in an embodiment, the motor assembly 130 further includes bearings 195. The bearings 195 are fixedly attached to the body 110 and coaxially sleeved on the shaft 141 of the drive motor 140, the rotation output shaft 145, the input gear 161 and the bevel gear 164, to support rotation of the shaft 141, the rotation output shaft 145, and the input gear 161 and the bevel gear 164.

Figure 5:
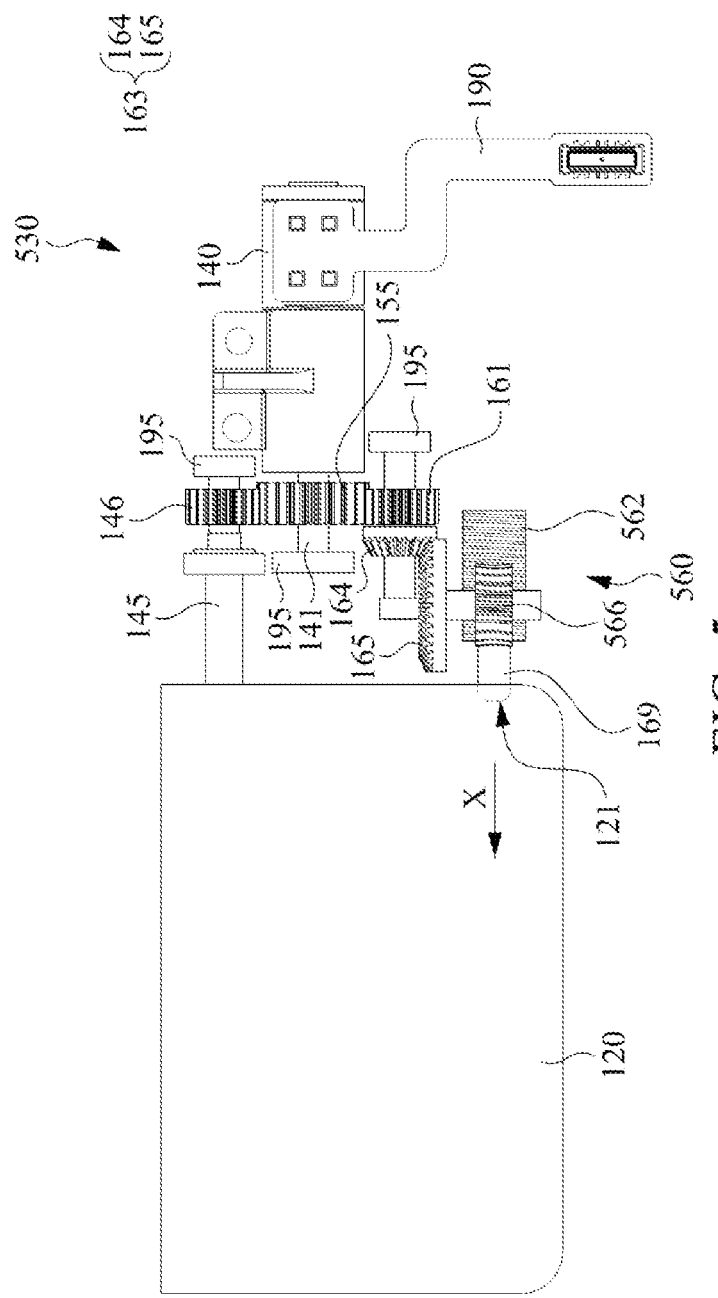
FIG. 5 is a schematic front view of a motor assembly and a function module according to another embodiment of the disclosure.

Referring to FIG. 5, a difference between this embodiment and the embodiments shown in FIG. 3 and FIG. 4 is that a linear motion component 562 of a displacement mechanism 560 of a motor assembly 530 is a gear rack. The gear rack is driven by the gear 566. Specifically, the gear 566 is coupled to the steering mechanism 163 and meshes with the gear rack to drive the gear rack to move toward or opposite to the direction X. The latch 169 connected to the gear rack moves along with the gear rack to limit the function module 120, or to detach from the function module 120. In an embodiment, the steering mechanism 163 is a bevel gear set with the bevel gears 164 and 165, the gear 566 and the bevel gear 165 are fixedly attached to the same shaft and rotate synchronously with the bevel gear 165.

Figure 6:
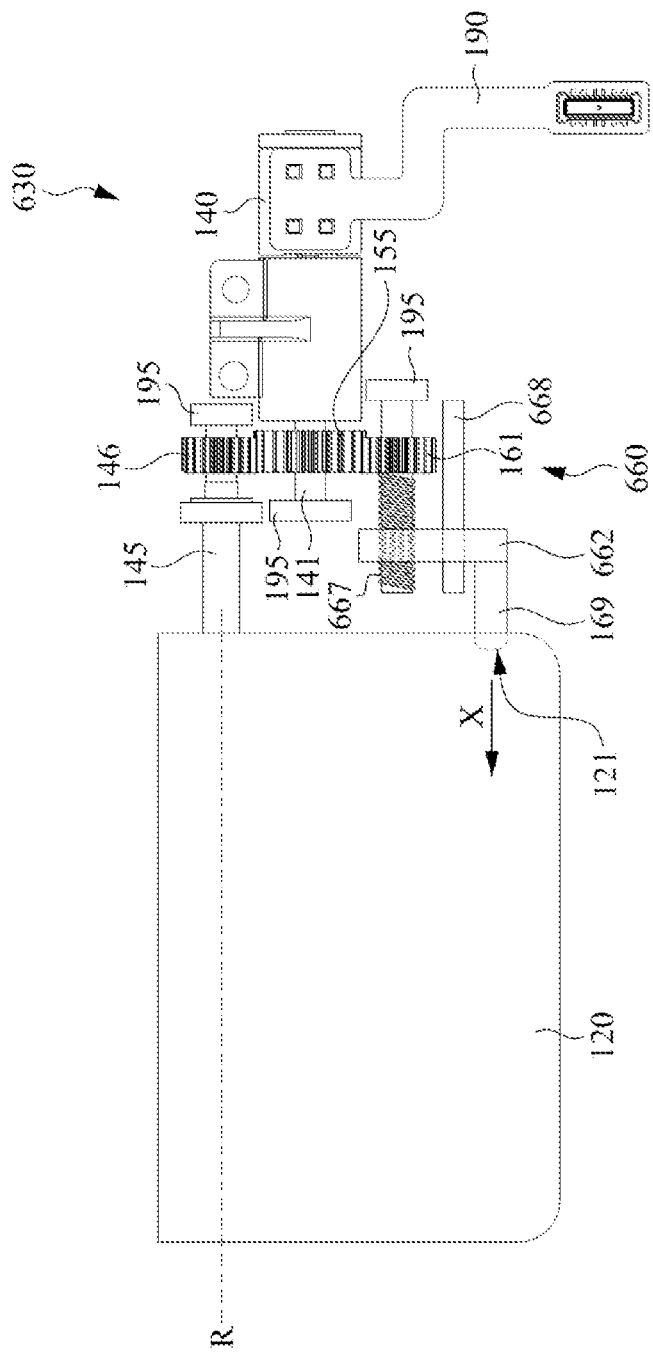
FIG. 6 is a schematic front view of a motor assembly and a function module according to another embodiment of the disclosure.

Referring to FIG. 6, in this embodiment, a displacement mechanism 660 of a motor assembly 630 includes a guide rail 668 and a rotatable screw rod 667. The guide rail 668 is disposed on one side of the screw rod 667 and extends substantially parallel to the screw rod 667. A linear motion component 662 is threadedly engaged with the screw rod 667. The guide rail 668 is connected to the linear motion component 662 and limits rotation of the linear motion component 662. When the drive motor 140 drives the screw rod 667 to rotate, the linear motion component 662 is driven by a thread on the screw rod 667 to move on the guide rail 668. The latch 169 connected to the linear motion component 662 and the linear motion component 662 move synchronously, to limit the function module 120 or to detach from the function module 120.

As shown in FIG. 6, in an embodiment, the screw rod 667 is fixedly attached to the input gear 161. In an embodiment, the gear 155 drives the input gear 161 and the screw rod 667 to rotate synchronously.

Based on the above, when the motor assembly of the disclosure drives the function module to rotate, the displacement mechanism drives the latch to move to limit the function module and lock the function module in the accommodation space.

Although the disclosure has been disclosed above by using the embodiments, the embodiments are not used to limit the disclosure. Any person skilled in the art may make various variations and modifications without departing from the spirit and scope of the disclosure. Therefore, the protection scope of the disclosure is defined by the appended claims.

What is claimed is:

1. A motor assembly, comprising:
    a drive motor, comprising a shaft;
    a gear, fixedly attached to the shaft;
    a rotation output shaft, comprising a gear teeth portion coupled to the gear;
    a displacement mechanism, synchronizing with the shaft and separated from the rotation output shaft, the displacement mechanism comprising a linear motion component and a steering mechanism, the steering mechanism being configured to transmit power between the shaft and the linear motion component, so that the linear motion component moves parallel to a rotation axis of the rotation output shaft; and
    a latch, connected to the linear motion component;
    wherein the linear motion component is a worm, the displacement mechanism further comprises a worm gear, and the worm gear is coupled to the steering mechanism and configured to drive the worm.

2. A motor assembly, comprising:
    a drive motor, comprising a shaft;
    a gear, fixedly attached to the shaft;
    a rotation output shaft, comprising a gear teeth portion coupled to the gear;
    a displacement mechanism, synchronizing with the shaft and separated from the rotation output shaft, the displacement mechanism comprising a linear motion component; and
    a latch, connected to the linear motion component;
    wherein the displacement mechanism further comprises:
    a screw rod, the linear motion component is threadedly engaged with the screw rod; and
    a guide rail, extending parallel to the screw rod and connected to the linear motion component, wherein the drive motor is configured to drive the screw rod to rotate, so that the linear motion component is driven by a thread on the screw rod to move on the guide rail.

3. An electronic device, comprising:
    a function module;
    a body, comprising an accommodation space, the accommodation space being configured to accommodate the function module; and
    a motor assembly, comprising:
    a drive motor, comprising a shaft;
    a gear, fixedly attached to the shaft;
    a rotation output shaft, comprising a gear teeth portion coupled to the gear, the rotation output shaft being connected to the function module and configured to drive the function module to rotate;
    a displacement mechanism, synchronizing with the shaft and separated from the rotation output shaft, the displacement mechanism comprising a linear motion component; and
    a latch, connected to the linear motion component and configured to limit the function module.

4. The electronic device according to claim 3, wherein when the function module rotates into the accommodation space along an axial direction, and cannot continue to rotate along the axial direction due to the body, the drive motor drives the latch to approach and limit the function module through the displacement mechanism.

5. The electronic device according to claim 4, wherein when the rotation output shaft applies a torque opposite to the axial direction to the function module, and the function module cannot rotate due to the latch, the drive motor drives the latch to move away from the function module and detach from the function module through the displacement mechanism.

6. The electronic device according to claim 3, wherein the displacement mechanism further comprises:
    a steering mechanism, configured to transmit power between the shaft and the linear motion component, so that the linear motion component moves parallel to a rotation axis of the rotation output shaft.

7. The electronic device according to claim 6, wherein the linear motion component is a worm, the displacement mechanism further comprises a worm gear, and the worm gear is coupled to the steering mechanism and configured to drive the worm.

8. The electronic device according to claim 3, wherein the displacement mechanism further comprises:
    a screw rod, the linear motion component is threadedly engaged with the screw rod; and
    a guide rail, extending parallel to the screw rod and connected to the linear motion component, wherein the drive motor is configured to drive the screw rod to rotate, so that the linear motion component is driven by a thread on the screw rod to move on the guide rail.

* * * * *